United States Patent [19]

Henzler et al.

[11] 3,832,881

[45] Sept. 3, 1974

[54] WORKPIECE TRANSLATION MECHANISM

[75] Inventors: William G. Henzler; Robert E. Spino, both of Toledo, Ohio

[73] Assignee: Henzler Manufacturing Corp., Toledo, Ohio

[22] Filed: Feb. 12, 1973

[21] Appl. No.: 331,789

[52] U.S. Cl............................ 72/405, 72/22, 72/420, 113/113 R
[51] Int. Cl............................................... B21j 11/00
[58] Field of Search ............ 72/405, 421, 420, 448, 72/22, 28; 198/218, 219, 220 CA; 113/113 R

[56] References Cited
UNITED STATES PATENTS

| | | | |
|---|---|---|---|
| 1,184,626 | 5/1916 | Cross .............................. 113/113 R |
| 1,242,206 | 10/1917 | Kruse ............................. 113/113 R |
| 1,950,377 | 3/1934 | Allen ................................. 198/219 |
| 3,521,760 | 7/1970 | Wallis ............................... 214/1 BB |
| 3,528,575 | 9/1970 | McCaughey ...................... 198/219 |
| 3,685,630 | 8/1972 | Pfrommer et al. ................ 198/219 |
| 3,753,489 | 8/1973 | Tomioka et al. .................. 198/219 |

Primary Examiner—Charles W. Lanham
Assistant Examiner—James R. Duzan
Attorney, Agent, or Firm—W. A. Schaich

[57] ABSTRACT

This invention relates to a workpiece translation mechanism for moving a workpiece through successive stations of a transfer stamping die. The workpiece is moved vertically out of the stationary half of the transfer die as the movable half of the die is shifted upwardly to its opened position, then the workpiece is moved horizontally to overlie the next station of the transfer die, and finally, the workpiece is moved vertically downwardly into the next station.

5 Claims, 7 Drawing Figures

3,832,881

WORKPIECE TRANSLATION MECHANISM

BACKGROUND OF THE INVENTION

Transfer stamping dies have long been utilized in the metal stamping industry. There have been a number of mechanisms heretofore proposed for effecting the movement of a workpiece through the successive stations of a transfer die. It is essential that the workpiece be lifted from the station upon which it has last been worked upon by motion in the same direction as the motion of the stamping die. It is equally essential that the workpiece be horizontally translated to exactly overlie the next workpiece station and then be moved vertically downwardly into the next station in the transfer die so that the workpiece is accurately positioned in such next station to receive the proper forming blow from the next reciprocation of the movable die part.

In accordance with this invention, the workpiece positioning mechanism is carried by a rectangular frame which normally surrounds the stationary half of the die set. The workpiece is engaged and moved by a pedestal, which, in turn, is mounted on a subframe carried by the rectangular frame. The pedestal projects through appropriate openings in the stationary die half. The required limited vertical motion of the workpiece is produced by camming the carrier frame vertically relative to the subframe, while the required horizontal or translational movement is produced by shifting the entire subframe relative to the stationary half of the mold mechanism.

Accordingly, it is an object of this invention to provide an improved workpiece positioning and translating mechanism for a transfer die. A particular object of this invention is to provide a workpiece translation mechanism for a transfer stamping operation, wherein all of the required motions of the workpiece in shifting from one work station to the next are automatically and accurately carried out by a hydraulically controlled mechanism.

Other objects and advantages of this invention will become apparent from the following description, taken in conjunction with the annexed sheets of drawings on which:

In FIG. 2, a single workpiece is illustrated as being in its proper position in the first station of the transfer die after it has been severed from a continuous strip.

AS SHOWN ON THE DRAWINGS

Figure 1:
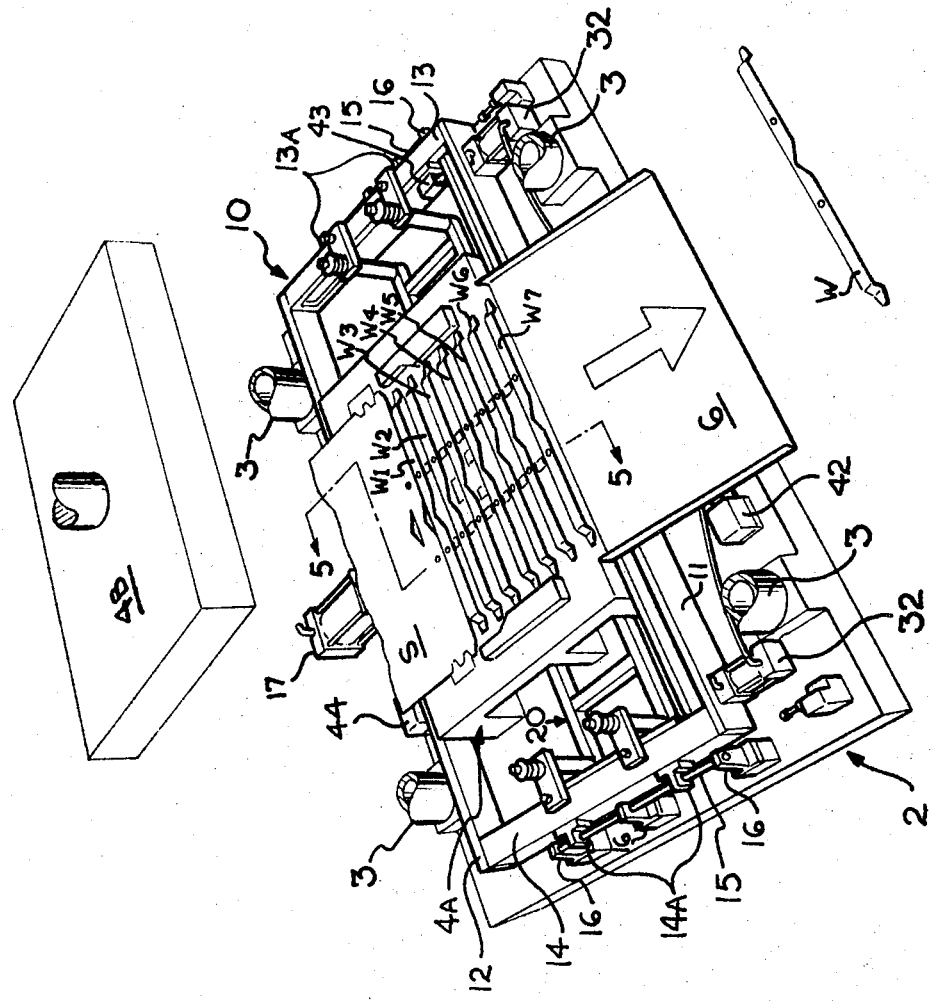
FIG. 1 is a schematic perspective view of a stamping press incorporating a transfer die and a workpiece translating mechanism embodying this invention and showing workpieces in their various successive positions in the transfer die.
Figure 2:
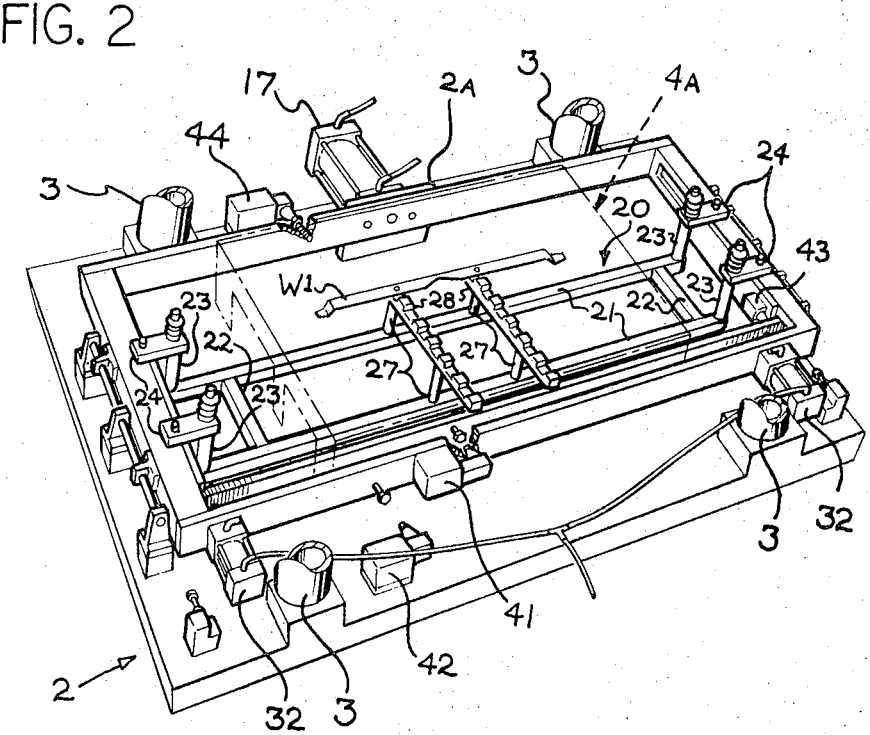
FIG. 2 is a perspective view of the workpiece translating mechanism, with the transfer die elements removed for clarity of illustration.

Referring to FIG. 1, there is schematically shown a conventional stamping press 1 having a bed plate 2, from which rises a plurality of support pillars 3. The top frame of the press (not shown) is supported on the upper extremities of the support pillars 3. A transfer die set comprising a stationary half 4A and a movable half 4B are mounted in the press in conventional fashion, with the stationary half 4A being securely anchored to the bed plate 2 and the movable half 4B mounted for reciprocating vertical movements relative to the stationary half 4A. The required guide rods and the actuating mechanism for the movable half 4B of the die mechanism are not shown since these elements form no part of the instant invention.

As is well known in the art, such presses are commonly fed by inserting a solid sheet or strip of metal stock S into one end of the transfer die set while the movable half 4B is in its elevated position. In one of the first operations of the die set, a workpiece blank W1 is sheared from the leading end of the solid sheet S. After being sheared, it is necessary to provide a mechanism for engaging each workpiece W1 and respectively translating the same successively through the various stations of the transfer die, here shown as a total of seven stations, at which successive stamping operations are performed on the workpieces W1, W2 . . . and W7 until the finished workpiece W is formed and discharged out of the die set down a chute 6.

This invention is entirely concerned with the workpiece translating mechanism that effects the shifting of the workpieces through the successive stations of the stationary half 4A of the transfer die. This translation mechanism is more clearly illustrated in FIGS. 2 through 5, and comprises a generally rectangular subframe 10 having its front and rear sides defined by solid bar members 11 and 12 and its right and left side members comprising hollow rectangular frame elements 13 and 14. It will be noted that the subframe 10 completely surrounds the stationary half 4A of the transfer die set and is sufficiently larger than said die set so as to permit front to rear horizontal reciprocating movement of the subframe 10 relative to the die set.

Figure 6:
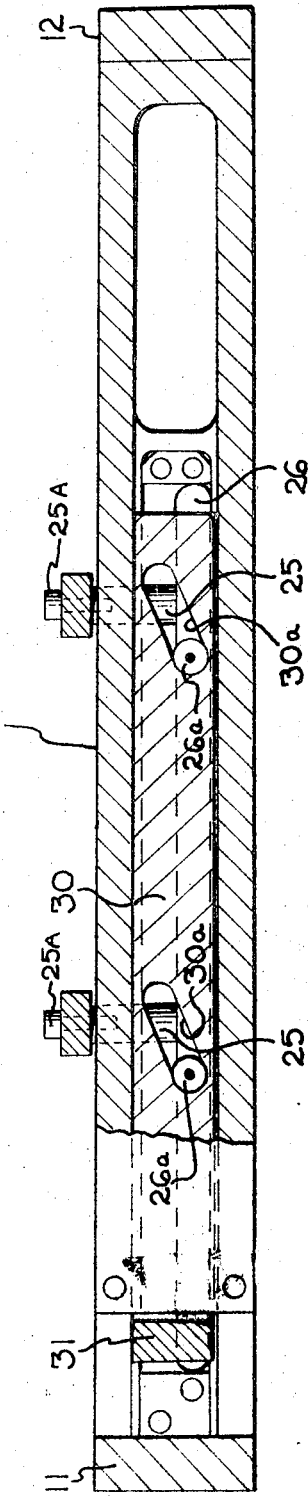
FIG. 6 is an enlarged scale sectional view taken on the plane 6—6 of FIG. 4.
Figure 5:
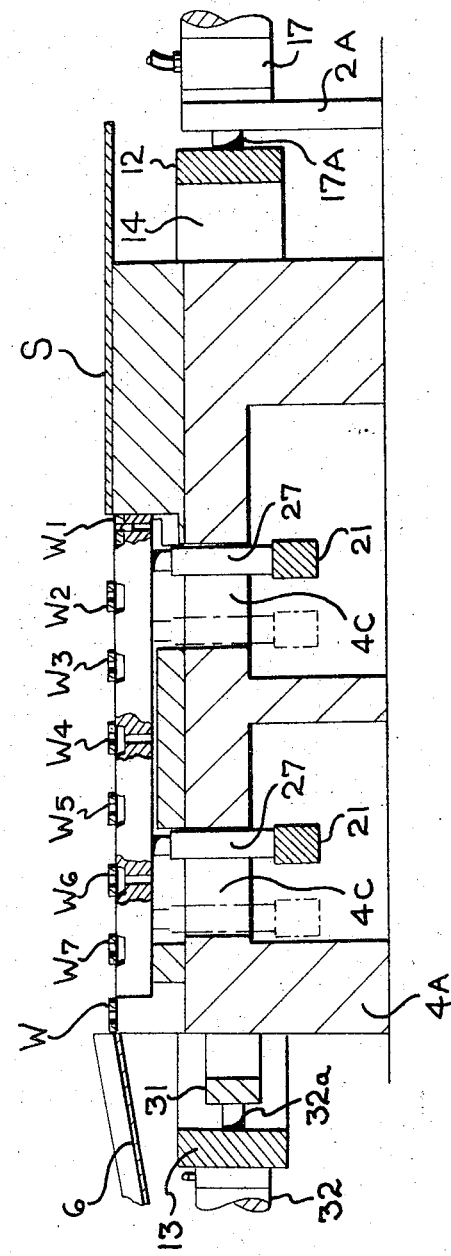
FIG. 5 is a sectional view of FIG. 1, taken on the plane 5—5.

Subframe 10 is slidably mounted for such reciprocating movement by a plurality of ears 13a and 14a which are respectively secured to the sides of the rectangular frame elements 13 and 14. The ears 13a and 14a are each suitably apertured so as to permit slidable mounting on horizontal rods 15 which are respectively supported by a plurality of brackets 16 which are, in turn, mounted in upstanding relationship on the bed plate 2. The horizontal movement of subframe 10 is produced by a hydraulic or air cylinder 17 (FIGS. 1 and 6), mounted on an upstanding bracket 2a at the rear end of base plate 2 and suitably connected to the rear side frame element 12 by a piston rod 17A.

Figure 7:
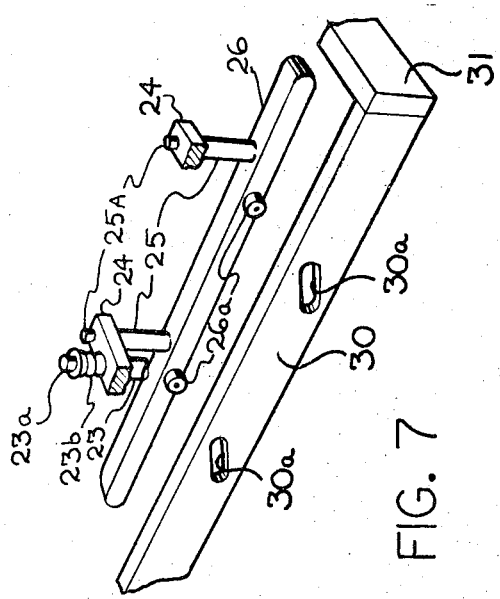
FIG. 7 is a partial exploded view of the camming elements controlling vertical motions of the workpiece.

A carrier frame 20 is provided which is of articulated construction and comprises two main horizontal bar elements 21 which normally rest in close proximity to the top of bed plate 2 and are interconnected by transverse bars 22. At the opposite extremities of each of the bar members 21, upstanding posts 23 are provided and bolts 23a in the top of posts 23 respectively pass through suitable apertures (not shown) in support plates 24. The opposite end of each support plate 24 rests upon an upstanding pin 25 (FIG. 7), being secured thereto by bolts 25a, and pins 25 in turn are rigidly secured to a positioning bar 26, which is mounted within the hollow interior of the transverse frame members 13 and 14. A yielding connection is provided between each positioning bar 26 and the carrier frame posts 23 by a spring 23b surrounding bolt 23a and engaging the top surface of bar 24.

Near the center of the main bars 21 of the carrier frame 20, a plurality of upstanding pedestal posts 27 are mounted, and these posts in turn support a pair of laterally spaced workpiece support members 28. Obviously, the stationary half 4A of the die set is provided with suitable recesses 4C (FIG. 6) in order to accommodate the posts 27 and the workpiece supports 28 and to permit them to be moved upwardly relative to the stationary half 4A of the die set to engage the successive workpieces W1, W2 ... and W7 passing through the die set. Each workpiece support 28 is provided with a plurality of appropriately shaped recesses 28a which are contoured so as to firmly engage a medial portion of the respective workpiece in its condition that it exists in each of the successive workpiece stations in the transfer die.

To effect the vertical reciprocating motion of the carrier frame 20 relative to the subframe 10, an actuating bar 30 (FIG. 6 and 7) is slidably mounted in each of the hollow side frame elements 13 and 14 and are rigidly interconnected at their front ends by a bar 31. A pair of cylinders 32 are respectively mounted on the opposite forward center of the subframe 10 and the actuating piston rods 32a of such cylinders respectively engage the connecting bar 31. Thus actuation of the cylinders 32 will produce a forward and rearward reciprocation of the cam bars 30 relative to the subframe 10. Each cam bar 30 is provided with at least a pair of inclined cam slots 30a which respectively engage rollers 26a carried by the positioning bar 26. Thus, the horizontal reciprocating movement of the actuating bars 30 relative to the subframe 10 results in a vertical reciprocal movement of the carrier frame 20 relative to the subframe 10 and hence brings the workpiece support elements 28 upward into engagement with the workpieces W1, W2 ... W7 and raises such workpieces out of the stamping recesses of the stationary half 4A of the transfer die set.

Figure 3:
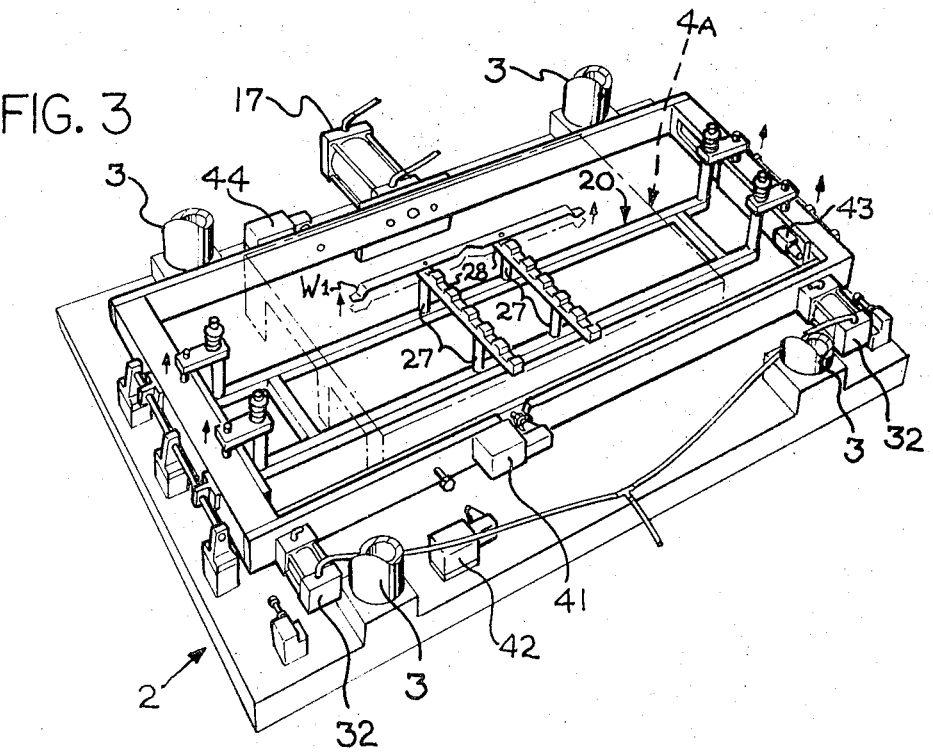
FIG. 3 is a view similar to FIG. 2 but showing the elevation of the workpiece out of the stationary half of the die set as a preliminary to moving the workpiece to the second station in the transfer die.
Figure 4:
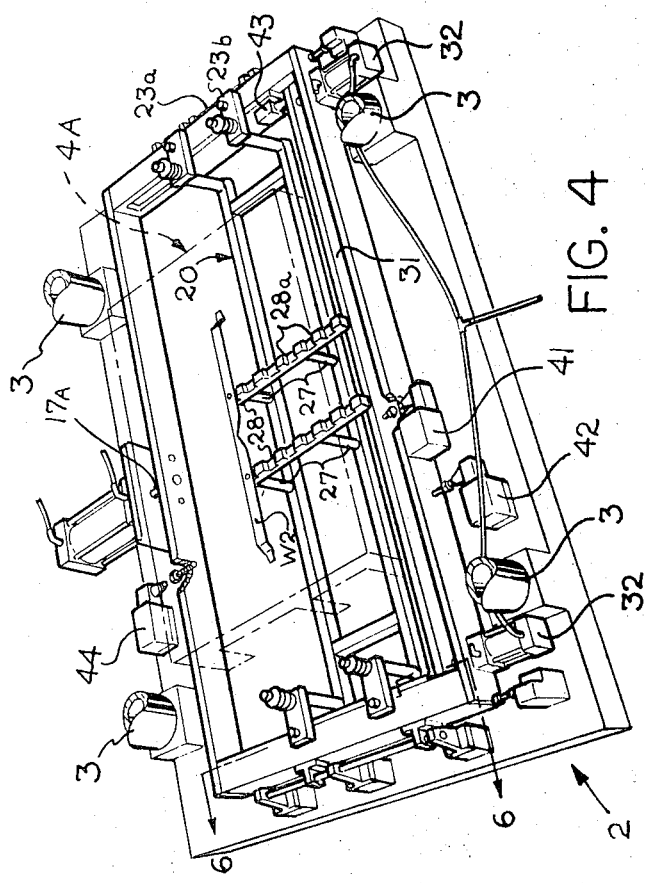
FIG. 4 is a view similar to FIG. 2 and 3 but showing the position of the single workpiece after it is translated horizontally to overlie the next station of the stationary half of the transfer die set and then lowered into such next station.

The sequence of operations is then as follows. Assuming that a strip or sheet of stock S has been set into the stamping press 1 and the die set has been reciprocated once to stamp a workpiece blank W1 from the leading edge of the sheet stock S, then, as the reciprocating half 4B of the die set is elevated, cylinders 32 are concurrently energized to effect a rearward translational movement of the actuating bars 30 relative to the subframe 10. This movement, through the cooperation of the inclined cam slots 30a with the rollers 26a effects an elevation of the positioning bars 25 and hence an elevation of the carrier frame 20 relative to the subframe 10, hence of the workpiece supports 28 relative to the stationary half 4A of the die set. As best illustrated in FIG. 3, this vertical motion lifts the workpiece W upwardly out of the recesses in the first station of the transfer die, moving it in the same direction as the movement of the movable half 4B of the die set so that no interference is created with the forming surfaces of the lower die half 4A. Next, the cylinder 17 is actuated to effect a forward horizontal movement of the entire rectangular subframe 10 relative to the stationary half 4A of the die set. This moves the workpiece to a position wherein the workpiece W2 now overlies the second set of recesses in the stationary half 4A of the transfer die set. Cylinders 32 are then actuated in reverse to cause a vertical lowering of the carrier frame 20 relative to the subframe 10, hence a lowering of the workpiece supporting members 28 relative to the stationary half 4A of the die set and hence the workpiece W2 is deposited in the next position in the transfer die set (FIG. 4). Cylinder 17 is then actuated in reverse to return the entire translating mechanism to its original starting position illustrated in FIG. 2.

If desired, the successive operation of the cylinders 32 and 17 may be automatically controlled by limit switches. Thus, a limit switch 41 may be provided to indicate when the carrier frame has been moved to its top vertical position. Through conventional control apparatus, the actuation of limit switch 41 can be utilized to then energize hydraulic cylinder 17 to produce the forward translational movements of the subframe 10. The completion of this translational movement may be detected by another limit switch 42, which, again through utilization of conventional control apparatus, effects the deenergization of cylinder 17 and energizes cylinders 32 in the reverse direction to effect the lowering of the carrier frame 20 relative to the subframe 10. The completion of this lowering motion effects the actuation of a third limit switch 43 which cuts off the energization of hydraulic cylinders 32 and energizes cylinder 17 in reverse direction to return the carrier frame horizontally rearwardly to its original starting position, where limit switch 44 deactivates the hydraulic system. Obviously, the initiation of the translational movements will be tied in with the control circuit which effects the reciprocating movements of the movable half 4B of the transfer die set so that none of the previously described workpiece translation movements are initiated until the movable half 4B of the die set is elevated above the stationary half 4A.

As will be evident to those skilled in the art, modifications of this invention can be made in the light of the foregoing disclosure without departing from the scope of the appended claims.

I claim:

1. A workpiece positioning mechanism for a transfer die press comprising, in construction:
   1. A bed plate adapted to support the stationary half of a transfer die set;
   2. A horizontal rectangular subframe slidably mounted on said bed plate for reciprocal horizontal movement in the same direction as the desired transfer movement of the workpiece relative to the transfer die, said subframe surrounding the stationary half of the transfer die set, and the first cylinder means for effecting reciprocal movement of said subframe;
   3. A workpiece carrier frame having its opposite ends respectively secured to two opposed sides of said subframe by a sliding connection permitting limited vertical movement of said carrier frame relative to said rectangular subframe;

4. Upstanding pedestal means on the center portions of said carrier frame adapted to engage workpieces resting in said stationary half of the transfer die;
5. A second cylinder means carried by said subframe and operatively connected to said carrier frame to effect vertical reciprocal movement of said carrier frame; and
6. Hydraulic control means for sequentially operating said first and second cylinder means to first vertically raise a workpiece out of the die, then move the workpiece horizontally to the next die station, then drop said workpiece vertically into the next die station, and then horizontally return the carrier frame to its starting position.

2. A workpiece positioning mechanism for a transfer die press comprising, in construction:
1. A bed plate adapted to support the stationary half of a transfer die set;
2. A horizontal rectangular subframe slidably mounted on said bed plate for reciprocal horizontal movement in the same direction as the desired transfer movement of the workpiece relative to the transfer die, said subframe surrounding the stationary half of the transfer die set, and first cylinder means for effecting reciprocal movement of said subframe;
3. A workpiece carrier frame having its opposite ends respectively secured to two opposed sides of said subframe by a sliding connection permitting limited vertical movement of said carrier frame relative to said rectangular subframe;
4. Upstanding pedestal means on the center portions of said carrier frame adapted to engage workpieces resting in said stationary half of the transfer die.
5. Cam means horizontally slidably mounted on each of said opposed sides of said subframe and respectively cooperating with rollers operatingly connected to said carrier frame to vertically raise and lower said carrier frame a distance sufficient to engage and lift a workpiece out of said stationary half of the transfer die, and a pair of second cylinder means for reciprocating said cam means; and
6. Hydraulic control means for sequentially operating said first and second cylinder means to first vertically raise a workpiece out of the die, then move the workpiece horizontally to the next die station, then drop said workpiece vertically into the next die station, and then horizontally return the carrier frame to its starting position.

3. The combination defined in claim 2, wherein said opposed sides of said subframe comprise a hollow tubular element and said cam means each comprises a bar slidably mounted in said tubular element and having inclined slots respectively cooperating with said rollers.

4. The combination defined in claim 1, wherein said stationary half of the transfer die set is provided with a horizontally extending recess accommodating said workpiece carrier and vertical recesses accommodating said upstanding pedestal means.

5. The method of advancing a workpiece through successive stations of a transfer die comprising the steps of:
1. Moving the workpiece upwardly out of the stationary half of the die set by elements passing vertically through openings in said die set and moving parallel to the opening movement of the movable half of the die set, then
2. moving the elements and supported workpiece horizontally transversely to overlie the next station transfer die, then
3. moving the elements downwardly to deposit the workpiece into said next station of the said transfer die set, and then
4. moving said elements horizontally transversely through said die set to their original position.

* * * * *